United States Patent
Armstrong et al.

(10) Patent No.: US 11,656,515 B2
(45) Date of Patent: May 23, 2023

(54) WSS UTILIZING LCOS ARRAYS COMPRISING RECTANGULAR PIXELS

(71) Applicant: II-VI Delaware, Inc, Wilmington, DE (US)

(72) Inventors: Julian Armstrong, Sydney (AU); Luke Stewart, Gladesville (AU); Glenn Wayne Baxter, Hornsby Heights (AU); Jonathan Plumridge, Sydney (AU)

(73) Assignee: II-VI DELAWARE, INC, Wilmington, DE (US)

( * ) Notice: Subject to any disclaimer, the term of this patent is extended or adjusted under 35 U.S.C. 154(b) by 0 days.

(21) Appl. No.: 17/304,824

(22) Filed: Jun. 25, 2021

(65) Prior Publication Data

US 2022/0413346 A1    Dec. 29, 2022

(51) Int. Cl.
*G02F 1/1362* (2006.01)
*G02B 6/35* (2006.01)

(52) U.S. Cl.
CPC .... *G02F 1/136277* (2013.01); *G02F 1/13624* (2013.01); *G02B 6/356* (2013.01)

(58) Field of Classification Search
CPC ........................... G02B 6/356; G02F 1/136277
See application file for complete search history.

(56) References Cited

U.S. PATENT DOCUMENTS

| | | | |
|---|---|---|---|
| 9,288,559 B2 | 3/2016 | Frisken et al. | |
| 10,042,121 B1 | 8/2018 | Haller | |
| 10,310,148 B2 | 6/2019 | Stewart et al. | |
| 10,859,739 B2 | 12/2020 | Stewart et al. | |
| 2005/0276537 A1* | 12/2005 | Frisken | G02B 6/2713 385/24 |
| 2009/0237380 A1 | 9/2009 | Kimura | |
| 2013/0070326 A1 | 3/2013 | Frisken et al. | |
| 2013/0177272 A1 | 7/2013 | Stewart et al. | |
| 2014/0186038 A1* | 7/2014 | Frisken | G02F 1/31 398/50 |
| 2014/0347733 A1 | 11/2014 | Stewart et al. | |
| 2016/0291405 A1 | 10/2016 | Frisken et al. | |
| 2019/0302330 A1 | 10/2019 | Stewart et al. | |

* cited by examiner

*Primary Examiner* — Alexander P Gross
(74) *Attorney, Agent, or Firm* — Blank Rome LLP

(57) ABSTRACT

A liquid crystal on silicon (LCOS) device includes a silicon substrate and a pair of electrodes including an upper and a lower electrode. The lower electrode is mounted to the silicon substrate and includes a two dimensional array of pixels extending in both a first and second dimension. LCOS device also includes a liquid crystal layer disposed between the upper and lower electrodes and configured to be driveable into a plurality of electrical states by drive signals provided to the pixels of the lower electrode. The pixels are rectangular in profile having longer sides in the first dimension than in the second dimension. Further, the two dimensional array includes a pixel pitch that is greater in the first dimension than in the second dimension.

20 Claims, 6 Drawing Sheets

WSS UTILIZING LCOS ARRAYS COMPRISING RECTANGULAR PIXELS

FIELD OF THE DISCLOSURE

The present application relates to liquid crystal devices and in particular to a liquid crystal on silicon array having a pixel pitch that is different in orthogonal axes.

Embodiments of the present disclosure are particularly adapted for use in optical switches such as a wavelength selective switch. However, it will be appreciated that the disclosure is applicable in broader contexts and other applications.

DESCRIPTION OF RELATED ART

Liquid crystal on silicon (LCOS) devices are one of the most commonly used switching engines for wavelength selective switches (WSS). In WSS devices, the optical fibers supporting the channels to be switched are separated along one axis, and the optical system is designed so that the LCOS can steer to any one of the fibers. This is called port switching. In an orthogonal axis, the light is dispersed in frequency so that small regions of the spectrum can be addressed independently by the LCOS. This is called wavelength selectivity.

To achieve the port switching and wavelength selectivity, one axis of the LCOS is used for separately manipulating individual wavelength channels while the other axis of pixels is used for switching the wavelength channels between the different optical fibers.

The performance of the device is generally proportional to the number of pixels contained in the pixel array. For example, an LCOS device with a higher number of pixels allows for switching between a greater number of optical fibers. Having a greater number of pixels available may also provide additional pixels to perform improved calibration processes and improve the granularity of the wavelength axis switching.

As the amount of global network traffic increases, there is a growing need for WSS devices to perform better and to switch between higher numbers of fibers. In addition, modules are being developed which incorporate multiple WSS devices that leverage a single common LCOS device to perform switching. In these higher performance devices, a greater number of pixels are required in the switching axis. In addition, wider frequency ranges are being pushed to increase fiber capacity (e.g. into both the C+L wavelength bands in a single WSS), which may require increased pixels in the wavelength axis.

Unfortunately, an increase in the number of pixels on an LCOS device increases the complexity of the driving circuitry, increases the overall power consumption of the device and places limitations on the available opto-mechanical design space. This, in turn, increases the manufacturing cost and ongoing operational cost of the devices.

Any discussion of the background art throughout the specification should in no way be considered as an admission that such art is widely known or forms part of common general knowledge in the field.

SUMMARY OF THE DISCLOSURE

In one configuration, a liquid crystal on silicon (LCOS) device disclosed herein comprises a silicon substrate, a pair of electrodes, and a liquid crystal layer. The pair of electrodes includes upper and lower electrodes. The lower electrode is mounted to the silicon substrate and includes a two-dimensional array of pixels, which extend in both first and second dimensions. The liquid crystal layer is disposed between the upper and lower electrodes. The liquid crystal layer is configured to be driveable into a plurality of electrical states by drive signals provided to the pixels of the lower electrode. The pixels are rectangular in profile having longer sides in the first dimension than in the second dimension. The two-dimensional array includes a pixel pitch that is greater in the first dimension than in the second dimension.

In another arrangement, a liquid crystal on silicon (LCOS) device comprises a two-dimensional array of independently driveable pixels disposed on a silicon substrate. The pitch of the pixels in a first dimension across the array is greater than a pitch of the pixels in a second dimension across the array.

In yet another arrangement, a liquid crystal on silicon (LCOS) device is used in switching optical channels between a plurality of optical ports of one or more wavelength selective switches (WSS). The LCOS device comprises a silicon substrate, a pair of electrodes, and a liquid crystal layer. The pair of electrodes includes upper and lower electrodes. The lower electrode is mounted to the silicon substrate and includes a two-dimensional array of pixels extending in both a first and second dimension. The liquid crystal layer is disposed between the upper and lower electrodes and is configured to be driveable into a plurality of electrical states by drive signals provided to the pixels of the lower electrode. The pitch of the pixels in one or two dimensions across the array is defined based on one or more characteristics of the one or more WSS devices.

A wavelength selective switch according to the present disclosure can incorporate the LCOS device disclosed herein and above.

A method of determining pixel specifications of a liquid crystal on silicon (LCOS) device is disclosed for use in one or more wavelength selective switches (WSS). The method includes: determining a number and/or a position of optical ports for the wavelength selective switch; calculating a range of switching angles required to switch the optical channels between the optical ports; and based on the calculated range of switching angles, determining a pixel size and a number of pixels for a switching axis of the LCOS device, wherein the pixels of the LCOS device are rectangular and have a degree of rectangularity that is based on the pixel size and number of pixels for the switching axis.

BRIEF DESCRIPTION OF THE DRAWINGS

Example embodiments of the disclosure will now be described, by way of example only, with reference to the accompanying drawings in which.

DETAILED DESCRIPTION

Figure 1:
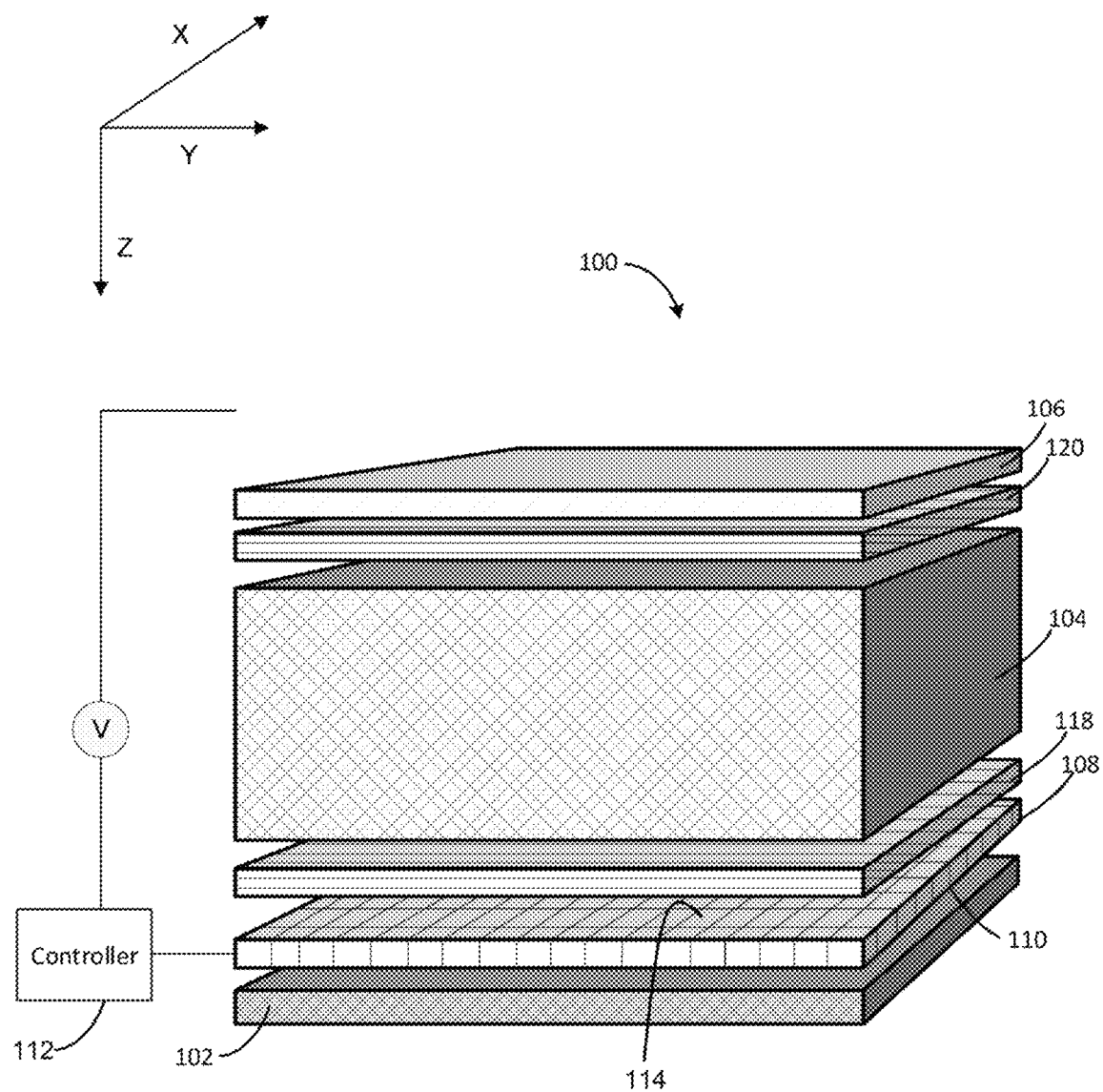
FIG. 1 is an exploded perspective sectional view of an LCOS device.

Looking initially at a device overview, FIG. 1 illustrates a liquid crystal on silicon (LCOS) device 100. Device 100 may also be referred to as an LCOS optical phase modulator as it modulates the phase of an incident optical signal propagating in a propagation dimension (z dimension). Device 100 comprises a silicon substrate 102 and a liquid crystal material layer 104 disposed between a pair of opposing electrodes 106 and 108. A first or "upper" electrode 106 is disposed above liquid crystal layer 104. A second or "lower" electrode 108 is mounted to the silicon substrate 102 and includes a two dimensional array 110 of pixels extending in both a first (x) and second (y) lateral dimension across the device 100. Liquid crystal layer 104 is configured to be driveable into a plurality of electrical states by voltage drive signals provided to lower electrode 108 by an electrical controller 112.

Upper electrode 106 is transparent or partially transparent indium-tin-oxide and allows the transmission of the optical signal into and out of device 100. Lower electrode 108 is reflective and includes array 110 of individually controllable aluminum pixels (e.g. 114). The pixels of lower electrode 108 are electrically driven for supplying an electric potential V across the liquid crystal layer 104 between upper and lower electrodes 106 and 108 to drive the liquid crystals within layer 104 in a predetermined configuration. Each pixel 114 in array 110 is individually drivable by electrical controller 112 at one of a number of predetermined voltage levels to provide a local phase modulation to an incident optical signal. Electrical control of the pixels 114 is provided by interconnections to electrical controller 112 through silicon substrate 102.

Pre-alignment of the liquid crystal materials within layer 104 may be provided by alignment layers 118 and 120. Layers 118 and 120 include a plurality of small grooves aligned along a predetermined direction to define the slow axis of the liquid crystal material.

Figure 2:
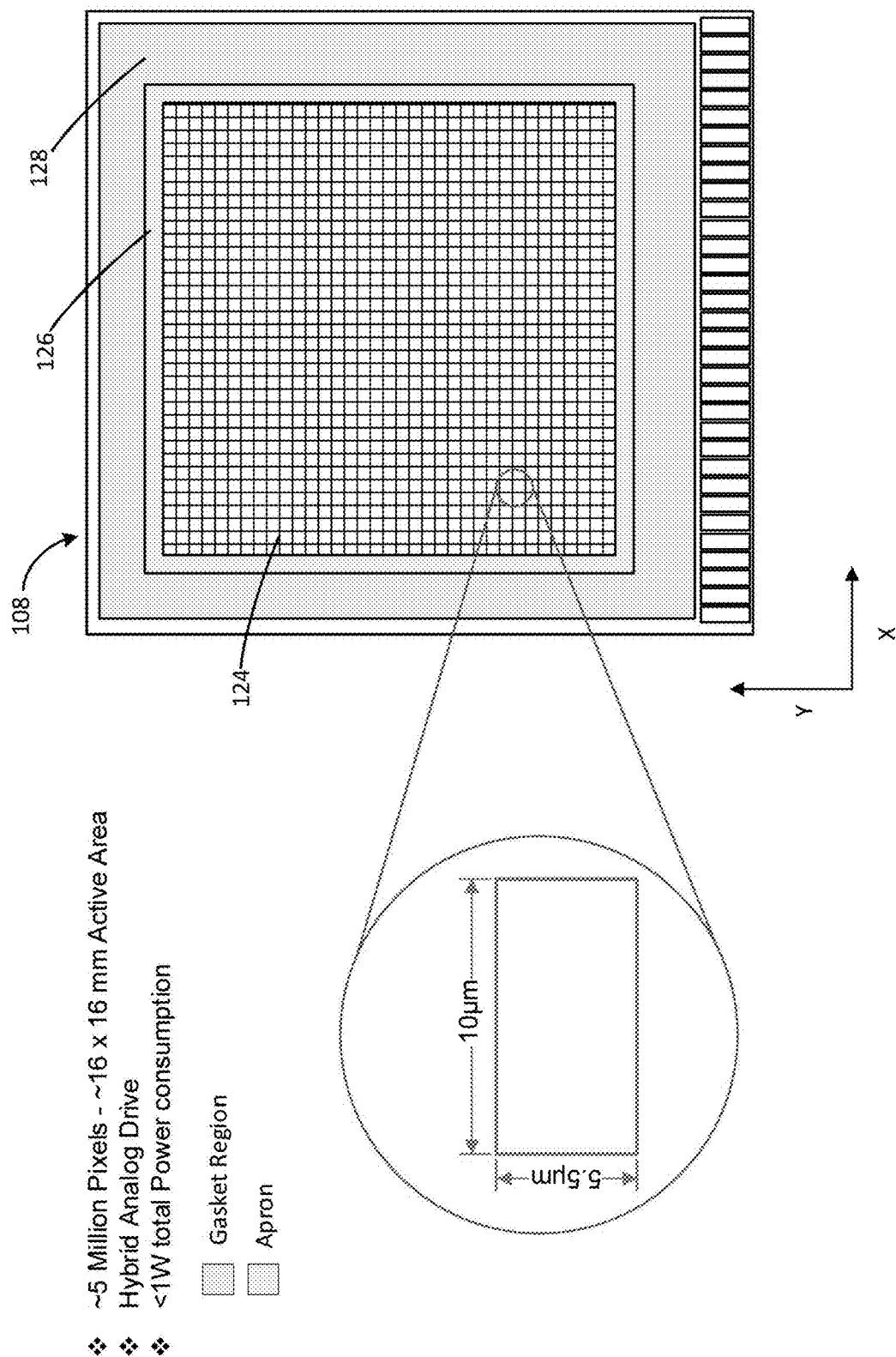
FIG. 2 is illustrated a plan view of a pixelated electrode of an LCOS device, showing a two-dimensional array of pixels.

Turning now to the rectangular pixel structure of the present disclosure, FIG. 2 illustrates a plan view of lower electrode 108 showing two-dimensional array 110 of pixels. As illustrated, the pixels are rectangular in profile having longer sides in the x dimension than in the y dimension. In some embodiments, the pixels have a length in the y dimension that is between 5 µm to 7 µm. In some embodiments, the pixels have a length in the x dimension that is between 8 µm to 12 µm. However, it will be appreciated that pixels having other rectangular dimensions may be implemented depending on the particular application.

A central pixel region 124 is used for active switching of optical channels. Around the central pixel region 124 is an apron 126 and a gasket region 128. These outer regions are generally not pixelated and/or not individually addressable, as such, two dimensional array 110 is wholly defined by central pixel region 124. The apron 126 is the area that immediately surrounds the central active pixel region, and does not contain a two-dimensional array of addressable pixels. The gasket region 128 at least partially surrounds the central pixel region 124 and apron 126, and connects the silicon substrate 102 to upper electrode 106. It may physically constrain the liquid crystal material. In some embodiments, more than one apron region may be included to perform different functions. In some embodiments, LCOS device 100 includes other regions or components not shown here.

Figure 3:
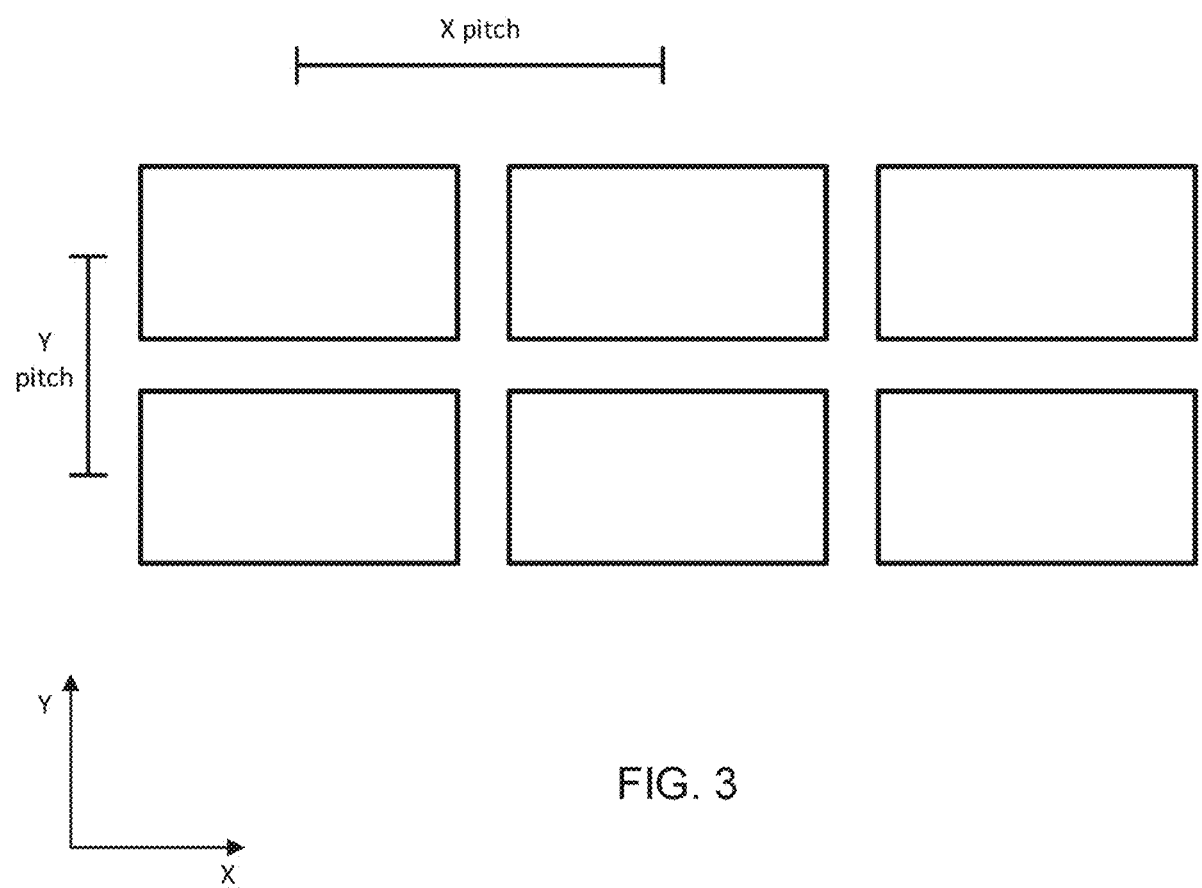
FIG. 3 is illustrated a sectional view of the pixelated electrode of FIG. 2 illustrating six rectangular pixels.

Furthermore, the two dimensional array 110 includes a pixel pitch that is greater in the x dimension than in the y dimension. In some embodiments, the pixel pitch in the x dimension is 1.3 to 2.0 times greater than the pixel pitch in the y dimension. Pixel pitch, which is also referred to as dot pitch, is the distance between pixels in array 110 along one dimension. This is illustrated schematically in FIG. 3, which illustrates six pixels across two x rows an three y columns of array 110. The pixel pitch is measured from the centers of each pixel and includes the width of the pixels plus a gap between pixels. This gap is defined to isolate adjacent pixels to reduce cross-talk. The gap is usually made as small as possible to maximize fill factor. The size of the gap is limited by factors such as a permissible level of electrical cross-talk between pixels and the integrated circuit layout. By way of example, the gap between pixels may be 0.2 µm.

This rectangular pixel structure allows for an increased number of pixels to be implemented in the y dimension than in the x dimension for a given LCOS device size. However, it will be appreciated that, in other embodiments and applications, an increased number of pixels may be implemented in the x dimension than in the y dimension for a given LCOS device size. In display applications, such as monitors, screens, televisions and projectors, the array 110 is typically required to follow standard display formats (aspect ratios) to correctly display content. Thus, the ratio of pixels in the x and y dimensions are constrained to predefined values set by industry. However, a primary application for the LCOS device 100 with rectangular pixel array is for a wavelength selective switch (WSS) device or multiple WSS devices operated concurrently. WSS devices have inherently different optical requirements in the two axes of the system and the inventors have recognized that this property can be used to design an optimized LCOS device.

Figure 4:
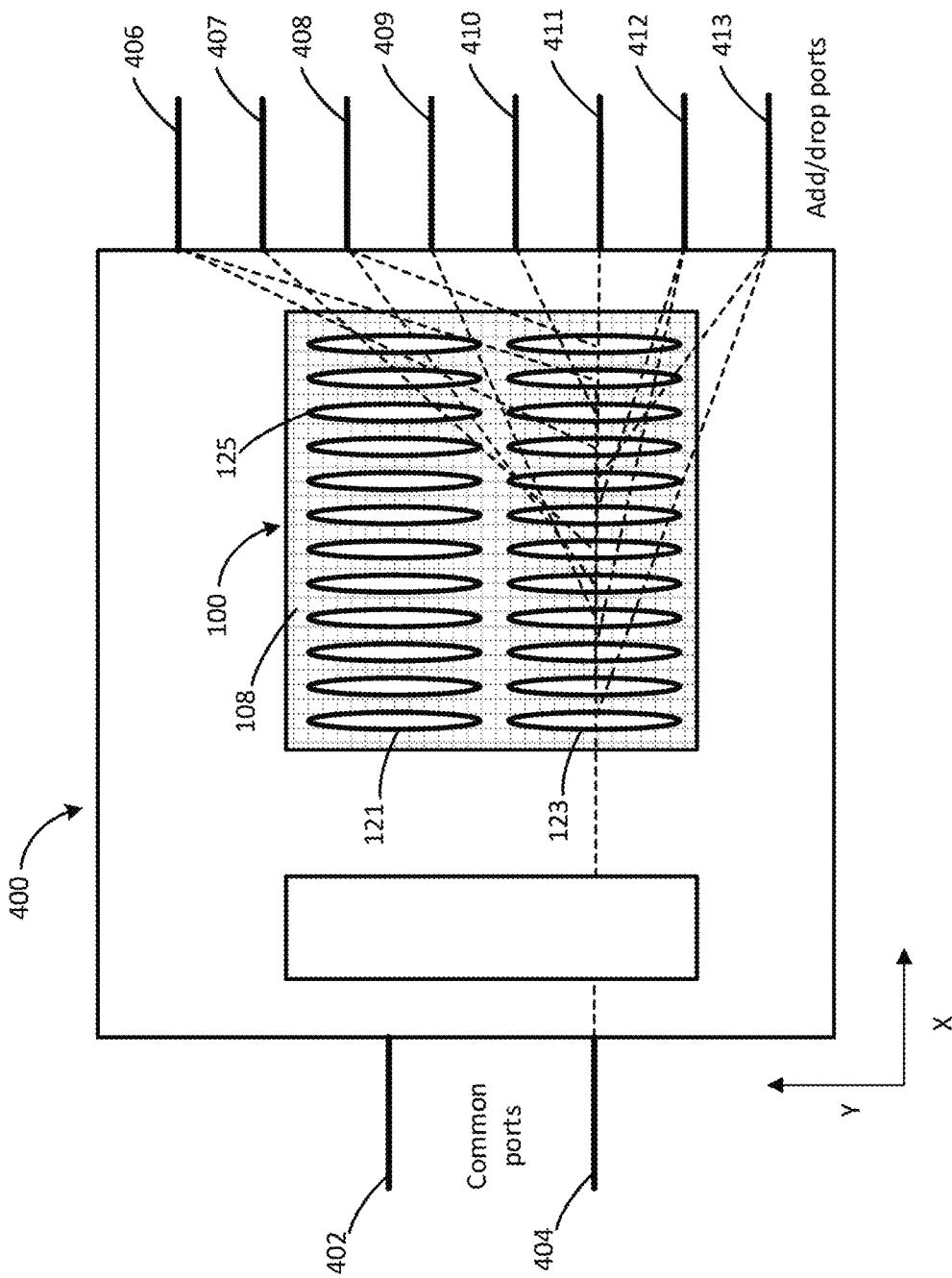
FIG. 4 is a schematic illustration of a wavelength selective switch showing optical channels incident onto the pixelated electrode of an LCOS device.

In a WSS, the optical fibers representing the input and output ports are separated in one axis, and the optical system is designed so that the LCOS can steer to any one of the fibers. In the orthogonal axis, individual optical channels can be dispersed into different wavelengths/frequencies such that the channels are incident onto different pixel regions of device 100 in the x dimension. The channel separation allows each channel to fall on a separate area of the LCOS and be independently switched by the LCOS device. This is illustrated schematically in FIG. 4, which schematically illustrates a WSS device 400 having two input common ports 402 and 404 and eight add/drop ports 406-413. In most practical applications, a WSS will have a much higher number of ports. In FIG. 4, two rows 121 and 123 of optical channels (e.g. 125) are dispersed by a dispersive element and spread across the x dimension of array 110. Each channel represents a different wavelength band used to carry optically encoded information.

Within the central pixel region 124, the y dimension of array 110 is used for switching the different wavelength channels between different ports in the wavelength selective switch. The beams of the optical channels are elongated in the y dimension by optics (not shown) so that they are incident onto a number of pixels in that dimension. Switching is performed by controlling the pixels along the y dimension of a channel region with different voltage signals so as to impose a phase change to the wavefront that reflects it at a given angle relative to the plane of device 100. Different predefined voltage signals provide different switching angles to the various wavelength channels to switch the channels between input and output ports of the WSS device.

The two rows 121 and 123 of channels represent different sets of optical ports or, equivalently, two different WSS devices which share common device 110 as the switching element. Some WSS devices only include a single row of wavelength channels, while others may include more than two rows of wavelength channels.

The inventors have identified that the shape and number of pixels of an LCOS device can be tailored to be optimized for a specific application having a number and arrangement of optical ports and number of channels to be switched. Firstly, the shape of the pixels can be designed to be rectangular to suit specific requirements in each dimension. Second, the number of pixels in each dimension can be determined to optimize for switching and channel manipulation.

In some embodiments, array 110 of pixels includes 1500 to 1900 pixels in the x dimension. In some embodiments, array 110 of pixels includes 2500 to 2700 pixels in the y dimension. In some embodiments, the two dimensional array of pixels is defined such that it has an aspect ratio that is non-standard display format (e.g. non-standard aspect ratio). A standard display format relates to a standard X:Y aspect ratio of a display such as a television or computer screen. Example, standard display formats include 16:9 (e.g. 1366×768 or 1920×1080 pixels), 3:2 (e.g. 2160×1440 or 2560×1700 pixels) and 16:10 (e.g. 1280×800 or 1920×1200 pixels). A non-standard display format refers to aspect or pixel ratios that are outside those that are known and used in the industry.

As the LCOS device 100 represents the primary switching element of a WSS, the geometry of the WSS and the LCOS characteristics (size, number of pixels etc.) are designed in conjunction with each other. An exemplary process of designing a tailored LCOS device for specific WSS applications is described below. A WSS incorporating an LCOS device 100 described above is another aspect of the present disclosure. In some embodiments, a single LCOS device 100 can be used as a common switching element for multiple WSS devices where the different WSS devices use different regions of pixels of the LCSO device.

Although described with reference to WSS applications, it will be appreciated that the LCOS device 100 may also have applications in other types of optical switching devices and display devices such as screens, monitors, televisions and projectors.

Method of Designing a LCOS Device

Figure 5:
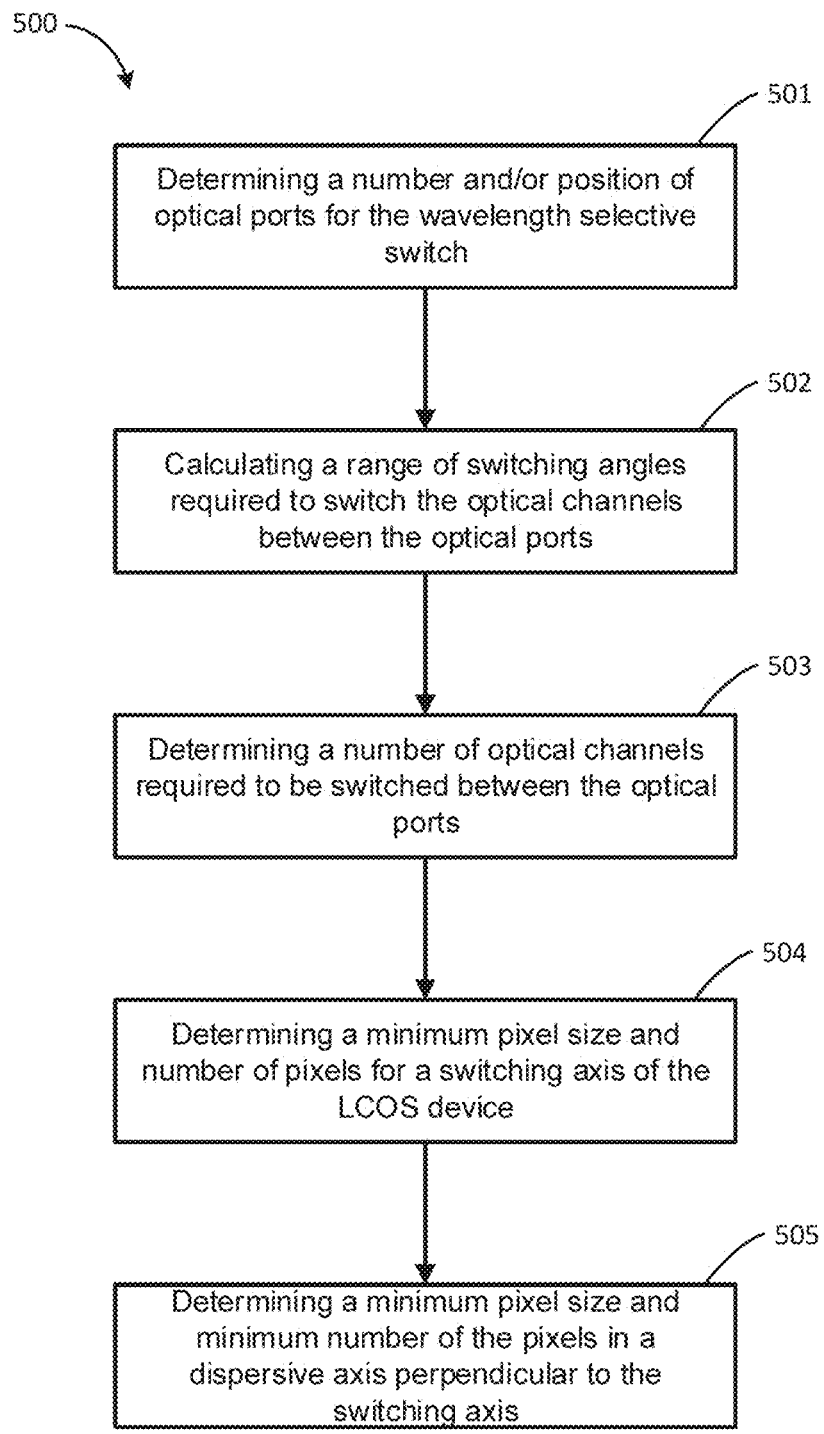
FIG. 5 is a flow chart of the primary steps in a method of determining pixel specifications for an LCOS device.

Referring now to FIG. 5, there is illustrated a method 500 of determining specifications for a liquid crystal on silicon (LCOS) device 100 for a WSS (or multiple WSS devices used concurrently). Method 500 includes, at step 501, determining a number and/or position of optical ports for the WSS. More broadly, this step may include determining what are the constraints required to achieve the specifications of the WSS device the LCOS will be used in. By way of example, one type of device includes a dual WSS having 60 (2×1×30) optical fiber ports disposed at no greater than 127 μm pitch to meet a device size restriction of 8 mm in the switching axis.

Method 500 includes, at step 501, defining a fiber map and/or calibration concept for the WSS device. This is a visual representation defining the geometry of the WSS including where the ports will be located in the WSS. Initially the fiber map may be dimensionless but knowledge of the optical and/or mechanical requirements of the device, such as port isolation and size restriction, will add dimensions to the map.

At step 502, a range of switching angles required to switch the optical channels between the optical ports is calculated. This includes determining the highest switching angles required to switch between the most angularly separated ports in the WSS. As illustrated in FIG. 4, different switching paths require different switching angles. To achieve greater switching angles requires a reduced distance between phase resets. To prevent increased optical loss, the number of pixels per phase reset must be maintained, and therefore more pixels in the y dimension are required. Therefore, the minimum number of pixels in the y dimension is proportional to the largest switching angles of the WSS. At this stage knowledge of the WSS needs to be incorporated; mechanical considerations such as size restriction will lead to a maximum size of the LCOS and optical considerations such as port isolation will lead to system focal length; which, when considered with step 501, will lead to the range of switching angles required for the WSS.

In some embodiments, the strictest constraint is not the largest overall switching angle within the device but the largest switching angle between a common port and an add/drop port. Common ports are considered the most important ports as they carry all of the optical channels.

Furthermore, if the WSS device is a dual type switching device as illustrated in FIG. 4, two rows of wavelength channels are required. This doubles the number of pixels required in the y dimension. Thus, the minimum number of pixels required in the y dimension is also dependent on the number of switching devices utilizing the LCOS device. In addition to dual type devices, quad type devices are also possible in which four WSS devices share a common LCOS device.

At step 503, more optical & mechanical requirements of the WSS should be incorporated; optical requirements such as the frequency range of the WSS, and the bandwidth of each channel. Also, mechanical constraints such as maximum size of LCOS need to be considered. In some embodiments, this includes determining a bandwidth of the collective optical channels to be switched by the WSS. By way of example, the WSS may be configured to switch channels across the span of the C-Band, which covers a bandwidth of about 5.0 THz between the 1530 nm and 1565 nm range. Mechanical constraints will define a maximum LCOS size in the wavelength axis, which for this example may be 20 mm.

Step 503 may also comprise determining any channel shaping to be applied to the optical channels (e.g. width of the optical beam for each channel), and what tuning and calibration is required per channel. By way of example, the granularity in wavelength axis (i.e. pixels/frequency range) will impact the frequency accuracy of channel centering and width.

At step 504, based on the calculated range of switching angles, a minimum pixel size and number of pixels for a switching (y) axis of the LCOS device 100 is determined to achieve that switching. In some embodiments, step 504 includes determining an overall size constraint of the LCOS device or WSS device. Step 504 may also include applying a target power consumption constraint of the LCOS device or WSS device. In some embodiments, this target power consumption may be based on desired frame rates, data rates and pixel resolution of the WSS device or devices.

Finally, at step 505, a minimum pixel size and minimum number of the pixels in a dispersive (x) axis perpendicular to the switching axis is determined. This calculation is based on the minimum required pixels in the switching axis and takes into account the total number of pixels and/or power consumption available.

Additional constraints may also be applied to the design process. These include a maximum electrical power consumption by the device, e.g. 1 W power consumption. Power consumption is proportional to the number of pixels in the LCOS device where a device with a higher number of pixels consumes more power. Other constraints include a desired frame rate, data rate or pixel level resolution.

Another constraint applied may be the overall physical dimensions of the WSS device. Optical devices like a WSS are typically required to fit into standardized optical rack units. This size constraint is typically requested by a customer. These requirements can be used to define what is termed an overall 'aperture' of the optical device, defining a filtered version of the physical constraints.

An example calculation of LCOS pixel specifications is included below.

Inputs:
WSS Requirements
2×1×30 ports
8 mm Mechanical height allowance for optics, driving a 127 µm fiber pitch
5 dB Insertion loss
30 dB Port isolation
Frequency window in C-Band (5.0 THz)
Max LCOS y dimension of 8 mm.
Max LCOS x dimension of 20 mm.
0.5 pixels/GHz to meet WSS optical bandwidth setting requirements.
Maximum electrical power consumption of 1 W.

These factors combine to define the maximum switching angle and the size of the LCOS. To maintain a minimum of 6 pixels per phase reset (as an example minimum number of pixels per phase reset) on outer ports over this propagation length:

Pixel size in switching axis<6.2 µm (or 6 um for this).

There may be a limit to the pixel area that is imposed by the required size of the pixel circuitry. By way of example, this pixel area may be constrained to 50 µm² or greater. To maintain>50 µm² pixel area:

Pixel size in dispersive axis must be >8.4 µm.

To meet desired channel performance across the 5.0 THz C-Band, channels should be dispersed on a 0.3 pixels per GHz basis. These numbers can be determined experimentally from various WSS/LCOS combinations.

In the switching axis:
8 mm @ 6 µm per pixel provides 1,333 pixels in the switching (y) dimension.

For power constraints, the total desired pixels is 2.4 megapixels. Therefore, the maximum number of pixels in the dispersive axis can be:

$$\frac{2.4 \times 10^6}{1333} = 1,800 \text{ pixels.}$$

This meets the 0.3 pixels per GHz requirement above.
The maximum dispersive axis pixel size can then be:

20 mm/1800 pixels=11.1 µm.

Which is greater than the minimum of 8.4 µm to maintain pixel area.

The final LCOS pixel size and number was determined to be:
Py=6.0 µm
Px=10.0 µm
Ny=1,340
Nx=1,600
Number of pixels=2.144 MPx
Pixel Area=60 µm²

Note that alternate designs that would use square pixel pitch would have issues for this design. Either the pixel area would not allow adequate space for pixel circuitry (in a 6 µm×6 µm pixel) or there would not be enough space for the number of pixels required in the switching axis (in a 10 µm×10 µm pixel).

In some embodiments, method 500 may be performed only for the switching (y) axis with the pixels in the dispersive (x) axis unchanged. In these embodiments, only steps 501, 502 and 504 are performed.

Figure 6:
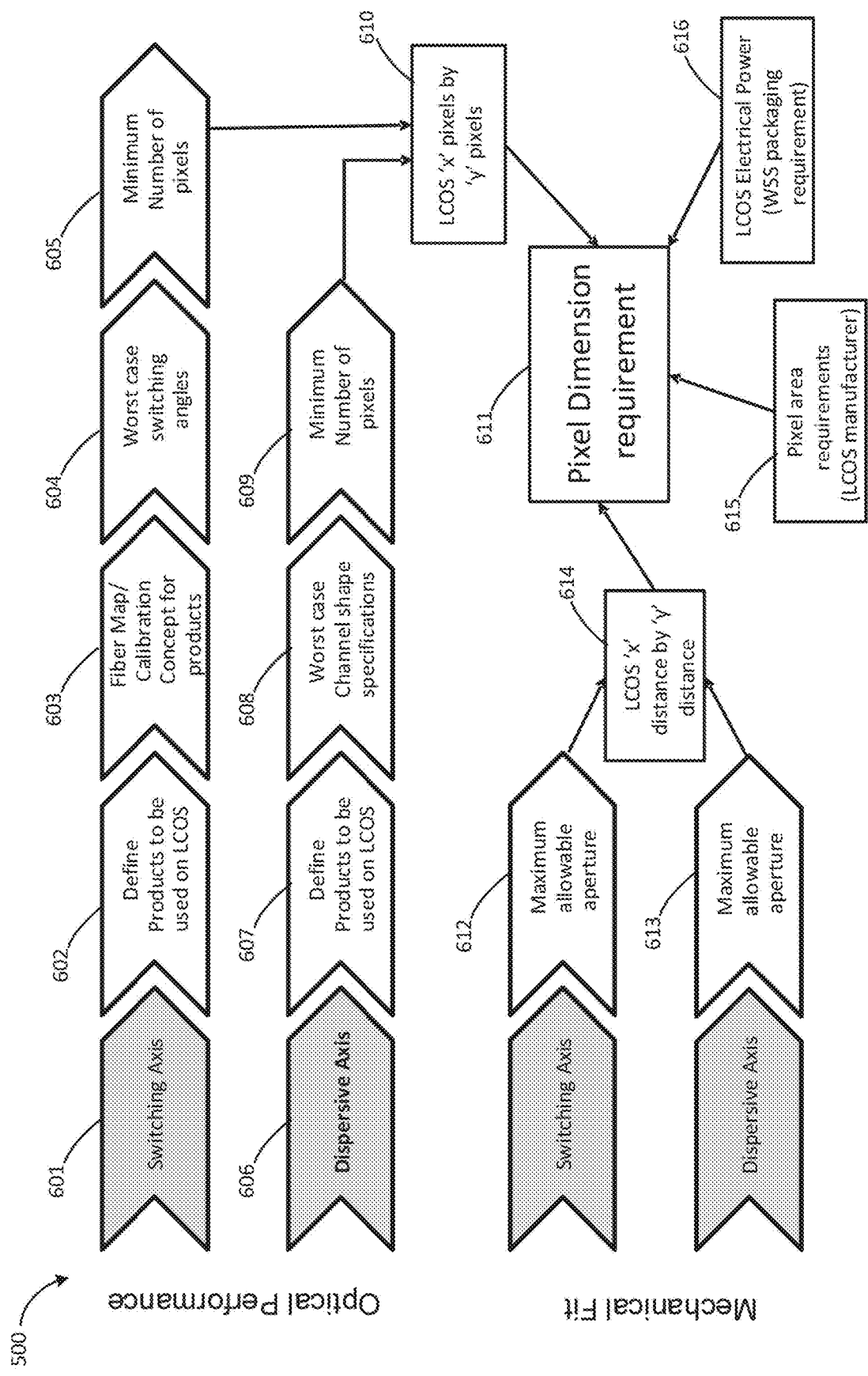
FIG. 6 is a flow chart of the primary steps in an alternate method of determining pixel specifications for an LCOS device.

In some embodiments, the required minimum pixels for the two different axes can be determined independently and combined to determine the required pixel size and pitch. This alternate method 600 for determining LCOS pixel specifications is illustrated in FIG. 6. A first design process 601 is performed in relation to the switching (y) axis only. This involves, at step 602, defining WSS products to be used with the LCOS and, at step 603, determining a fiber map and calibration concept for the type of WSS product. These steps are equivalent to step 501 of method 500. At step 604, worst cast switching angles are determined. This step is equivalent to step 502 of method 500. At step 605, a minimum number of pixels is calculated for the switching axis. This is performed in step 504 of method 500.

The output of design process 601 is a minimum number of pixels that are required in the switching axis of the LCOS. Separately, a second design process 606 is performed in relation to the dispersive (x) axis. At step 607, the WSS product to be used with the LCOS is defined. This step may be the same as step 602 or be performed in conjunction with step 602. At step 608, worst case channel shape specifications are determined. These are the minimum requirements to achieve efficient switching and considers factors such as channel cross talk, number of channels and the transmission bandwidth (e.g. C-Band). At step 609, a minimum number of pixels in the dispersive axis is determined.

The outputs from both design processes 601 and 606 are combined at step 710 and used in a pixel dimension calculation at step 711. This pixel dimension calculation step calculates the minimum required pixel dimensions in both the switching and dispersive axes and takes in other constraints. These other constraints include mechanical constraints such as a maximum allowable switching aperture, determined at step 712, and a maximum allowable dispersive aperture, determined at step 713. These steps are combined at step 714 to determine an overall LCOS size in both the x and y dimensions. These dimensions are fed to the pixel dimension calculation step 711. Also, at step 715, pixel area requirements (typically specified by the LCOS manufacturer) are fed to the pixel dimension calculation step 711. Finally, at step 716, LCOS electrical power constraints are input to the pixel dimension calculation step 711.

With all of these constraints applied, an appropriate pixel shape (dimensions in the x and y axes) and pitch in both axes can be calculated. The optimum result in most applications is a rectangular pixel design in which the pixel width in the dispersive axis is longer than the pixel height in the switching axis. Also, the pitch in the switching axis is higher than in the dispersive axis. These design parameters are provided to an LCOS manufacturer for manufacture of the desired optimized device.

The methods 500 and 600 provide for defining an LCOS device 100 in which the pitch of the pixels in one or two dimensions across the array is defined based on one or more characteristics of the WSS device. The shape of the pixels may also be defined based on one or more characteristics of the WSS device. The characteristics of the WSS device include:

the number and/or position of optical ports in the WSS;
an overall size of the WSS device;
a target power consumption value of the WSS device;
a number of optical channels; and/or
a bandwidth of the collective optical channels to be switched by the WSS.

Allowing the pixels to move significantly away from 'square' allows for balancing pixel and thermal constraints, while still being able to meet optical performance.

Embodiments described herein are intended to cover any adaptations or variations of the present disclosure. Although the present disclosure has been described and explained in terms of particular exemplary embodiments, one skilled in the art will realize that additional embodiments can be readily envisioned that are within the scope of the present disclosure.

What is claimed is:

1. A method of determining pixel specifications of a liquid crystal on silicon (LCOS) device for use in one or more wavelength selective switches (WSS), the method including:
   determining one of a number and a position of optical ports of the one or more WSS, the optical ports configured to transmit optical signals;
   calculating a range of switching angles required to switch optical channels between the optical ports;
   determining, based on the range of switching angles, for a plurality of pixels formed in the LCOS device, a first pixel size that is a length of each of the plurality of pixels located along a switching axis of the LCOS device, a first number of pixels that is a number of the plurality of pixels in the LCOS device located along the switching axis, a second pixel size that is a length of each of the plurality of pixels located along a dispersive axis of the LCOS device, and a second number of pixels that is a number of the plurality of pixels in the LCOS device located along the dispersive axis; and
   setting the plurality of pixels of the LCOS device to be rectangular and having a degree of rectangularity based on the first pixel size and the first number of pixels located along the switching axis.

2. The method according to claim 1, wherein determining the first pixel size and the first number of pixels located along the switching axis of the LCOS device comprises determining a minimum of the first pixel size and a minimum of the first number of pixels, the method further comprising:
   determining a number of the optical channels required to be switched between the optical ports; and
   determining a second minimum pixel size and a second minimum number of the second number of pixels located along the dispersive axis,
   wherein the dispersive axis is perpendicular to the switching axis.

3. The method according to claim 2, wherein determining the second minimum pixel size and the second minimum number of the pixels located along the dispersive axis comprises determining a bandwidth of the optical channels to be switched by the one or more WSS.

4. The method according to claim 2, wherein determining the number of optical channels required to be switched between the optical ports comprises determining an overall size of one of the LCOS device and the one or more WSS.

5. The method according to claim 1, wherein determining the first pixel size and the first number of pixels located along the switching axis includes determining a target power consumption value of one of the LCOS device and the one or more WSS.

6. The method according to claim 1, wherein determining the first pixel size and the first number of pixels located along the switching axis of the LCOS device comprises determining a port isolation requirement between adjacent ones of the optical ports.

7. The method according to claim 1, comprising setting a pitch of the second number of pixels located along the dispersive axis to be greater than a pitch of the first number of pixels located along the switching axis.

8. The method according to claim 1, comprising defining dimensions of the first pixel size of the pixels located along the switching axis based upon one or more of desired frame rates, data rates, and pixel level resolution of the WSS.

9. The method according to claim 1, wherein the first number of pixels located along the switching axis is proportional to a largest switching angle of the range of switching angles.

10. The method according to claim 1, wherein the LCOS device is implemented in a plurality of the one or more WSS.

11. The method according to claim 10, wherein the first number of pixels located along the switching axis is dependent upon the plurality of the one or more WSS.

12. The method according to claim 1, wherein the second number of pixels is based on a preset ratio of pixels/GHz of a frequency range by which the optical ports transmit the optical signals.

13. A method of determining pixel specifications of a liquid crystal on silicon (LCOS) device for use in one or more wavelength selective switches (WSS), the method including:
   determining one of a number and a position of optical ports of the one or more WSS, the optical ports configured to transmit optical signals;
   calculating a range of switching angles required to switch optical channels between the optical ports; and
   determining, based on the range of switching angles, for a plurality of pixels formed in the LCOS device along a dispersive axis and a switching axis, a pixel length size of each of the plurality of pixels located along the dispersive axis of the LCOS device and a total number of the plurality of pixels in the LCOS device located along the dispersive axis.

14. The method according to claim 13, further comprising:
   determining, based on the range of switching angles, for the plurality of pixels formed in the LCOS device, a pixel length size of each of the plurality of pixels located along the switching axis of the LCOS device and a total number of the plurality of pixels in the LCOS device located along the switching axis,
   wherein the dispersive axis is perpendicular to the switching axis.

15. The method according to claim 14, further comprising:
   setting the plurality of pixels of the LCOS device to be rectangular and having a degree of rectangularity based on the pixel length size and the total number of the plurality of pixels located along the switching axis.

16. The method according to claim 14, wherein determining the pixel length size and the total number of the plurality of pixels located along the switching axis of the LCOS device comprises:
  determining, based upon a bandwidth of the optical channels to be switched by the one or more WSS, a minimum pixel length size and a minimum of the total number of the plurality of pixels located along the dispersive axis; and
  determining, based upon a target power consumption value of one of the LCOS device and the one or more WSS, a minimum of the pixel length size and a minimum of the total number of the plurality of pixels located along the switching axis.

17. The method according to claim 14, wherein determining the pixel length size and the total number of the plurality of pixels located along the switching axis of the LCOS device comprises determining a port isolation requirement between adjacent ones of the optical ports.

18. The method according to claim 14, further comprising setting a pitch of the total number of the plurality of pixels located along the dispersive axis to be greater than a pitch of the total number of the plurality of pixels located along the switching axis.

19. The method according to claim 13, wherein one of:
  the total number of the plurality of pixels located along the switching axis is proportional to a largest switching angle of the range of switching angles, and
  the total number of the plurality of pixels located along the dispersive axis is based on a preset ratio of pixels/GHz of a frequency range by which the optical ports transmit the optical signals.

20. A method of determining pixel specifications of a liquid crystal on silicon (LCOS) device for use in one or more wavelength selective switches (WSS), the method including:
  calculating a range of switching angles required to switch optical channels between optical ports of the one or more WSS; and
  determining, based on the range of switching angles, for a plurality of pixels formed in the LCOS device located along a dispersive axis and a switching axis, a pixel length size of each of the plurality of pixels located along the dispersive axis of the LCOS device and a total number of the plurality of pixels in the LCOS device located along the dispersive axis.

* * * * *